April 27, 1971     JUN WATANABE ET AL     3,576,680

DRY CELL

Original Filed Aug. 10, 1967

3,576,680
DRY CELL
Jun Watanabe, Kobe, Akira Fujiwara and Masahiro Kuwazaki, Moriguchi, and Tadashi Sawai, Kyoto, Japan, assignors to Matsushita Electric Industrial Co., Ltd., Osaka, Japan
Continuation of application Ser. No. 659,635, Aug. 10, 1967. This application Mar. 12, 1970, Ser. No. 18,011
Claims priority, application Japan, Aug. 16, 1966, 41/54,309
Int. Cl. H01m 1/02
U.S. Cl. 136—132                 1 Claim

ABSTRACT OF THE DISCLOSURE

A dry cell in which an elementary cell is housed in an outer casing whose adjoining edges are fastly bonded to each other by means of an adhesive, and which has a high discharge efficiency and improved leakage proof.

---

This is a continuation of application Ser. No. 659,635, filed Aug. 10, 1967, which is now abandoned.

The present invention relates to a dry cell in which a metallic outer casing having the adjoining edges thereof fastly bonded to each other by means of an adhesive is used to house an elementary cell therein, so as to obtain an improved discharge efficiency of the elementary cell and a highly compression-resistant cell structure.

With the remarkable development and progress in the equipment, such as transistor radios, transistor televisions and transistor tape recorders, using dry cells as a power source in recent years, there has been an increasing demand for a dry cell which is small in size and large in capacity. In this respect, it may be said that a conventional dry cell of the type which uses a metallic outer casing having the adjoining edges thereof fastened in a double-locking fashion, as shown in FIG. 7 of the accompanying drawings, does not meet the desired conditions set forth above. This is because of the following reason.

Namely, in this type of conventional dry cell, as shown in FIG. 7, the edge portions 2 and 2' of a metallic outer casing 1 are respectively flexed inwardly into hook-like shapes and are fastened with each other to form a joint 3 consisting of four-layer structure. As a result, the joint 3 projects inwardly of the casing 1 in a thickness at least three times the thickness of said casing or in a length of the order of 1 to 1.5 mm. Such axial projection formed at the joint 3 of the metallic outer casing 1 obviously necessitates the outer diameter of an elementary cell 4 to be fitted in said casing to be reduced. This will in turn necessitate the outer diameter of a zinc casing 5 serving as the negative electrode of said elementary cell to be reduced, with the amount of current-generating element to be filled in said zinc casing 5 decreasing, and thus makes it impossible to obtain a dry cell having a satisfactory capacity. Speaking more specifically, the conventional dry cell is unsatisfactory due to the facts that the area of the zinc casing 5 which participates in the discharge reaction is reduced, and that the amount of an anolyte mixture 6 is decreased with respect to the amount of a paste electrolyte 7 in the zinc casing 5, or the amount of current-generating element participating in the discharge reaction is decreased, as a result of reduction in outer diameter of said zinc casing. In FIG. 7, numeral 8 designates a carbon rod embedded centrally of the anolyte mixture 6, which serves as the positive electrode.

The conventional dry cell of the type described is also unsatisfactory in respect of leakage proof because, since the metallic outer casing 1 and the elementary cell 4 mounted therein cannot be arranged in concentrical relation, the tightening force at the upper and lower end portions of said metallic outer casing 1 is not uniform, presenting the cause of electrolyte leakage during use of the dry cell. Describing in more detail, the elementary cell 4 mounted in the metallic outer casing 1 cannot be concentric with said outer casing due to the joint 3 of said outer casing projecting inwardly, and this causes a sleeve 9, made of such material as a kraft paper and surrounding the zinc casing 5, to be held in contact with said inwardly projecting joint 3 at a portion, so that said portion of the sleeve 9 is reduced in strength. Therefore, when the zinc casing 5 has been consumed to a certain degree upon usage of the dry cell, the electrolyte having been reduced in viscosity and leaking through the zinc casing 5, tends to penetrate through that portion of the sleeve 9 which has been weakened due to contact with the inwardly projecting joint 3, and finally flows outside of the outer casing through the joint of said outer casing.

In order to obviate the foregoing drawbacks of the conventional dry cell, there has been proposed a metallic outer casing whose edges are abutted against each other at their end faces or a metallic outer casing whose edge portions are overlapped and fastened to each other by means of spot welding or a metallic outer casing consisting of a seamless pipe.

These metallic outer casings were successful to some extent in avoiding the reduction in outer diameter of the elementary cell, as had been encountered with the metallic outer casing having the edges thereof fastened in a double-locking fashion as described previously, but they induced another drawback peculiar to each of them. Namely the metallic outer casing of the type which has the edge portions thereof abutted against each other at their end faces, has the drawback that, where the casing is used for housing an elementary cell, such as that in the Unit I-type or Unit II-type dry cell, the discharge capacity of which is relatively large for a single cell, the abutting edges are opened with the consequent deformation of the outer casing, due to swelling of the elementary cell caused by generation of gases in said elementary cell or swelling of the paste electrolyte layer occurring as the current-generating reaction proceeds, and as a result, the electrolyte leaking from the elementary cell upon consumption of said elementary cell flows outside of the outer casing through the gap formed between the edges of the outer casing and further removal of the dry cell from the equipment, such as transistor radio, in which it is mounted is rendered difficult.

On the other hand, the metallic outer casing of the type which has the opposite edge portions thereof overlapped and fastened with each other by means of spot welding or soldering, had the drawback that a coating layer formed on the surface of the casing, with characters and/or decorative patterns imprinted thereon, is subjected to decoloration or delamination under the heat during the spot welding operation, with the result that commercial value of the product dry cell is degraded.

Now, the metallic outer casing of the type which is formed of a seamless pipe, had the drawbacks that, because of the tubular shape, the printing operation of the surface thereof is rendered difficult and that, because of it being a seamless pipe, it is costly, although it is capable of eliminating the conventional drawbacks that the elementary cell to be mounted therein is required to be reduced in outer diameter and that the outer casing and the elementary cell cannot be arranged concentrically of each other.

The present invention has for its object the provision of an improved dry cell which is free from the foregoing drawbacks of the conventional dry cells and which uses a metallic outer casing which has the opposite edges thereof bonded firmly by means of a thermosetting, thermoplastic or heat-melting adhesive.

The present invention will be described more specifically hereinafter with reference to the accompanying drawings; in which FIG. 1 is a side elevational view of a dry cell embodying the present invention;

Figure 1:
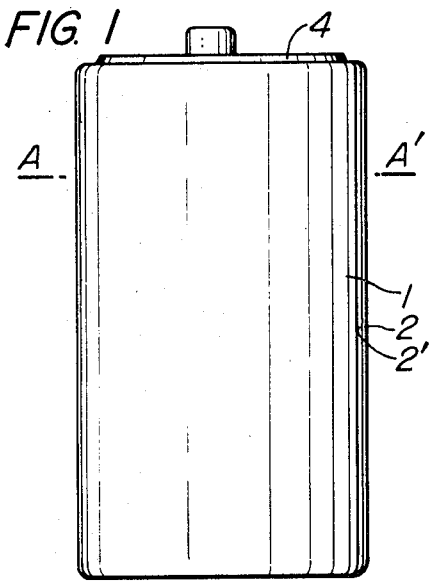
Figure 2:
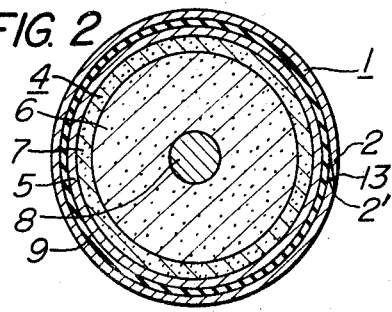
FIG. 2 is a transverse cross sectional view of the dry cell taken on the line A—A of FIG. 1.

According to a preferred embodiment of the invention, shown in FIGS. 1 and 2, the opposite edges 2 and 2' of a metallic outer casing 1 are fastly bonded to each other either by the use of a thermosetting resin selected from the group consisting of epoxy resins, phenol resins, phenol-polyamide resins, epoxy-polyamide resins, phenol-epoxy resins and phenol-vinyl acetal resins or by the use of a composition comprising a basic material consisting of a solvent-less thermoplastic resin, e.g. polyethylene, a copolymer of ethylene and vinyl acetate or an acrylic gum, which is curable very quickly to produce a strong bonding strength and is not substantially vaporized or dried, and a natural resin, such as rosin, asphalt, polyvinyl alcohol, glue, glycerin, wax or ester gum, added thereto in a suitable amount as determined by the purpose to be served. Of the adhesives mentioned above, those composed of a thermoplastic resin or an acrylic gum, as being the basic material, and a natural resin or asphalt, are melted at a temperature ranging from 150 to 230° C.

Such heat-melting adhesives include those which are sold on the market under the trade name of Semedain No. 6500 and No. 6600 of the hot melt type, which are mixtures of a copolymer between ethylene and vinyl acetate, and paraffin, and have a melting point of 180° C.

Figure 3:
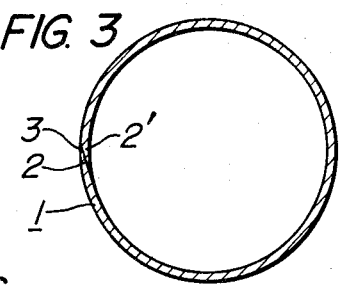
FIG. 3 is a transverse cross sectional view of the outer casing of the dry cell.

In bonding the edges of the outer casing with such adhesives, it is only necessary to cut the respective edges 2 and 2' of the metallic outer casing 1 slantingly in a manner such that the confronting cut end faces are mated with each other as shown in FIG. 3 and thereafter bond said cut end faces by means of the adhesive. Where a thermosetting epoxy-polyamide resin is used as an adhesive, the cut end faces, after application of the adhesive thereto, must be left to stand still for 20 minutes at a temperature of 150° C. so as to effect curing of the resin. On the other hand, where a composition comprising a nitrile rubber and 20% by weight of wax is used as an adhesive, the composition applied to the mating faces is hardened quickly by cooling the same.

As a thermoplastic basic material for the adhesives, butadiene rubbers and neoprenes are also usable, besides nitrile rubbers. The amount of a wax or natural resin to be blended with such basic materials, according to the results of the experiments, is preferably up to 20% by weight of a basic material used, and thus an adhesive can be obtained which has an improved fluidity, adhesion and shock resistance. An adhesive composed of a nitrile rubber and 20% by weight of wax has a particularly remarkable shock resistance.

Figure 4:
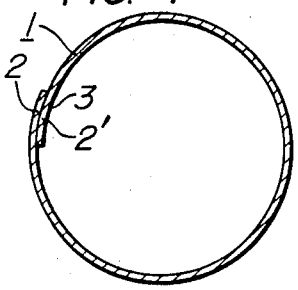
FIGS. 4, 5 and 6 are transverse cross sectional views of the outer casings of other embodiments of the present invention respectively.
Figure 6:
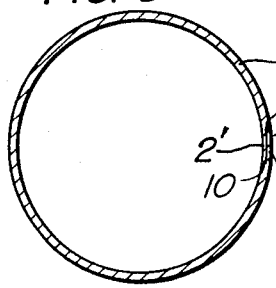
Figure 5:
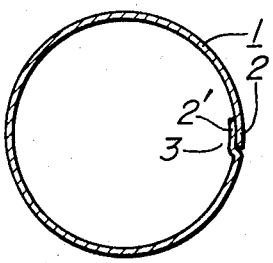

Satisfactory bonding between the edges 2 and 2' of the metallic outer casing 1 may also be obtained by merely overlapping the edge portions each other in a manner as shown in FIG. 4, or by flexing one of the edges 2 inwardly in an amount corresponding to the wall thickness of the metallic outer casing to form an offset lip and interfitting the other edge 2' with said offset lip as shown in FIG. 5, or by forming a shoulder 10 in each of the edges 2 and 2' of the outer casing and interlocking said shoulders with each other as shown in FIG. 6, in lieu of cutting the edges slantingly as described previously and shown in FIG. 3.

Still alternatively, the end faces of the edges may be bonded to each other with an adhesive as they are, though not illustrated.

When the edges 2 and 2' of the outer casing 1 are bonded by merely overlapping said edges each other, the circumferential width of such overlapping portion is preferably between ½ and ⅙ the entire circumferential length of the outer casing, because the overlapping portion of a width greater than ½ of the entire circumferential length of the outer casing is undesirable due to the inner diameter of said outer casing being reduced, whereas that smaller than ⅙ of the entire circumferential length of the outer casing is apt to be too narrow to obtain satisfactory bonding. That is to say that satisfactory bonding of the edges can be obtained in the range specified, without reducing the inner diameter of the outer casing 1. The dry cell shown in FIG. 2 is composed using the metallic outer casing shown in FIG. 3. As can be seen from this dry cell according to the present invention, the elementary cell 4 to be mounted in the outer casing is not required to be reduced in outer diameter and it is possible to arrange said elementary cell concentrically of the metallic outer casing 1 and consequently it is possible to obtain a uniform tightening strength at both the upper and lower ends of said outer casing.

For mounting the elementary cell 4 in the metallic outer casing 1 of the configuration shown in FIGS. 3 or 6, in which the joint 3 of the edges 2 and 2' thereof is not projecting inwardly, it is obviously not necessary to reduce the outer diameter of said elementary cell. In the case of the metallic outer casings shown in FIGS. 4 and 5, it is seen that the interior wall of the outer casing is projecting inwardly at the joint 3 by an amount equal to the wall thickness of said outer casing. However, even in this case, the amount of the projection is smaller than that in the case of the conventional outer casing wherein the edges thereof are fastened in a double-locking fashion, and accordingly the elementary cell is required to be less reduced in its outer diameter and the current-generating element of the elementary cell 4 is required to be reduced less than in the case of latter. The same is of course true when the present invention is applied to the outer casings of layer built dry cells.

Now, the advantages of the present invention will be illustrated by the results of the experiments. In one experiment, a dry cell of the structure shown in FIG. 2 which is composed of the metallic outer casing 1 and the elementary cell 4 mounted in said metallic outer casing, with a sleeve 9, such as of kraft paper, fitted thereon, and a dry cell of the structure shown in FIG. 7 in which the metallic outer casing 1 has its opposite edges 2 and 2' fastened in a double-locking fashion, were caused to discharge for 30 minutes every day and six days in a week repeatedly, by connecting each of them to a 4 ohm-resistance, until the voltages thereof drop to 0.85 v. On the other hand, the same dry cells were caused to discharge for consecutive 4 hours every day and six days in a week repeatedly, by connecting each of them to a 40 ohm-resistance, until the voltages thereof drop to 0.9 v. The accumulative discharge times of the respective dry cells in the respective runs are shown in Table 1 below for comparison. The dry cells used are all of Unit I-type.

Figure 7:
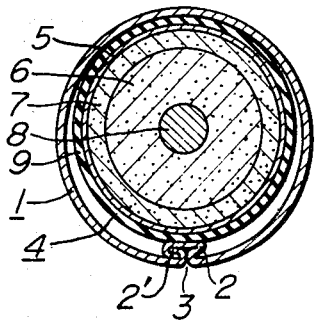
FIG. 7 is a transverse cross sectional view of the outer casing of a conventional dry cell.

|  | Amount of mixture anolyte, g. | 4 ohm-resistance, min. | 40 ohm-resistance, hours |
|---|---|---|---|
| Dry cell of the structure shown in Fig. 2. | 48 | 730 | 155 |
| Dry cell of the structure shown in Fig. 7. | 42 | 650 | 130 |

As described earlier, there is a strong demand for a compact large-capacity dry cell in these days when dry cell-operative cordless equipment are making a remarkable progress rapidly and the quality of dry cells is being improved gradually to meet such demand. However, the leakage proof efficiency of dry cells, on the contrary, tends to be lowered due to the amount of gases generated increasing and/or accelerated hydrolysis of the paste hydrolyte. With the conventional dry cells, a faulty condition has been encountered particularly when the elementary cell mounted in the metallic outer casing is swollen by the generation of gases and the joint of the outer casing is loosened or disconnected under the stress of such swelling, permitting the electrolyte to leak to the outside of the outer casing or reducing the improved discharge efficiency of the dry cell.

The dry cell according to the present invention is also an improvement over the conventional ones in respect of leakage proof. Namely, according to the present invention, the metallic outer casing forms no projection at all at its joint on the interior surface thereof, or even when a projection is formed, such projection is only as thin as the wall thickness of said outer casing. Therefore, it is possible to arrange the outer casing substantially concentrically of the elementary cell mounted in said outer casing, and thus the tightening force of the outer casing can be uniformalized and in addition a sleeve, made of such material as kraft paper and surrounding the elementary cell, will not be pressed against the interior wall of the outer casing locally. It is also to be noted that, according to the present invention, the joint of the outer casing will not be disconnected even under such a faulty condition that the elementary cell interior thereof is swollen by the gases generated during the discharge reaction, because the adjoining edges of the outer casing is fastly bonded to each other by means of an adhesive. Consequently, the metallic outer casing as a whole provides an excellent leakage proof.

In order to compare the leakage-proof efficiency of the dry cell according to the present invention with those of conventional ones, another experiment was conducted in which twenty each of a dry cell A of the structure as shown in FIG. 2, dry cell B of the structure as shown in FIG. 7 and dry cell C of the structure in which the opposite edges of the outer casing are fastened by merely abutting them against each other, were caused to discharge continuously by connecting each of them to a 4 ohm-resistance and the numbers of faulty dry cells in each group were counted on the 30th day, 60th day and 100th day, the results of which are shown in Table 2 below.

TABLE 2

|  | 30th day | 60th day | 100th day |
|---|---|---|---|
| Dry cell: | | | |
| A | 0/20 | 0/20 | 0/20 |
| B | 2/20 | 5/20 | 8/20 |
| C | 0/20 | 7/20 | 12/20 |

Figure 8:
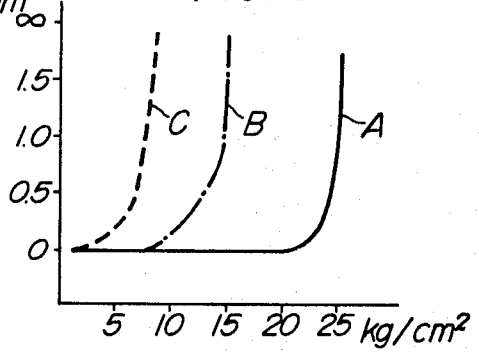
FIG. 8 is a chart illustrating the compression characteristics of various outer casings.

On the other hand, the outer casings of the respective dry cells A, B and C were subjected to compression test, with the results shown in the chart of FIG. 8. From this chart, it will be understood that the dry cell A, that is of the present invention, is superior to the dry cell B in respect of compression resistance.

An adhesive used for bonding the opposite edges of the metallic outer casing, according to the present invention is heated at about 230° C. at highest, no matter whether it is thermosetting, thermoplastic or heat-melting in nature. The heating is accomplished for a relatively short period, so that a coating layer formed on the surface of outer casing, with characters and/or decorative pattern imprinted thereon, will not be subjected to decoloration or delamination. It should also be noted that, according to the present invention, bonding of the opposite edges of the outer casing can be effected for a relatively short period and no large-scale facility is required for such bonding operation. Accordingly, it is possible to produce dry cells in a large quantity at a cheap price.

From the foregoing description, it will be understood that the present invention, in which the outer casing has its opposite edges bonded fastly by means of a resin adhesive, has the advantages that there is no need of reducing the outer diameter of an elementary cell to be mounted in said outer casing, which enables a required amount of the current-generating element to be secured and the discharge efficiency of the dry cell to be improved accordingly, and that elementary cell and the metallic outer casing can be arranged substantially in concentrical relation to each other, so that the tightening force of said outer casing can be uniformalized and the dry cell is rendered highly resistive against compression, and further the leakage proof efficiency of the dry cell is enhanced.

What is claimed is:

1. A dry cell of minimum dimensions and having a current generating element of maximum dimensions, comprising a positive electrode, an anolyte mixture adjacent to and surrounding said positive electrode, an electrolyte adjacent to and surrounding said anolyte mixture, a metallic inner casing adjacent to and surrounding said electrolyte, a sleeve adjacent to and surrounding said inner casing and an outer metallic casing adjacent to and surrounding said sleeve; wherein each of said anolyte, electrolyte, inner casing, sleeve and outer casing layers is uniformly in contact with each next preceding and succeeding layers of said dry cell; each said layer having a central axis coincident with a central axis of each of said other layers; and wherein said outer casing further comprises first and second edges which abut each other on a diagonal bias to form a seam such that the inner surface of said seam presents a generally smooth face, said edges being bonded by a heat melting organic adhesive.

References Cited

UNITED STATES PATENTS

| 1,937,045 | 11/1933 | Schulte et al. | 136—108.3 |
| 2,307,763 | 1/1943 | Deibel | 136—133 |
| 2,967,161 | 1/1961 | Hart | 220—81 |

DONALD L. WALTON, Primary Examiner

U.S. Cl. X.R.

136—166; 220—81